United States Patent
Petersen et al.

(10) Patent No.: US 10,003,261 B2
(45) Date of Patent: Jun. 19, 2018

(54) HIGH EFFICIENCY SWITCHING CHARGER WITH REDUCED INPUT VOLTAGE RIPPLE

(71) Applicant: Dialog Semiconductor (UK) Limited, London (GB)

(72) Inventors: Holger Petersen, Pastetten (DE); Nicola Macri, Feldkirchen (DE)

(73) Assignee: Dialog Semiconductor (UK) Limited, London (GB)

(*) Notice: Subject to any disclaimer, the term of this patent is extended or adjusted under 35 U.S.C. 154(b) by 259 days.

(21) Appl. No.: 14/966,003

(22) Filed: Dec. 11, 2015

(65) Prior Publication Data
US 2016/0344214 A1 Nov. 24, 2016

(30) Foreign Application Priority Data

May 21, 2015 (DE) .......................... 10 2015 209 330

(51) Int. Cl.
*H02J 7/00* (2006.01)
*H02M 3/158* (2006.01)
*H02M 3/07* (2006.01)

(52) U.S. Cl.
CPC .......... *H02M 3/158* (2013.01); *H02J 7/0052* (2013.01); *H02M 3/07* (2013.01)

(58) Field of Classification Search
CPC .......... H02M 3/158; H02M 3/07; H02M 1/14; H02J 7/0052

(Continued)

(56) References Cited

U.S. PATENT DOCUMENTS 6,201,717 B1 3/2001 Grant
7,696,735 B2 4/2010 Oraw et al.
(Continued)

FOREIGN PATENT DOCUMENTS

DE 102010013375 10/2011
DE 112012004377 7/2014
WO WO 2012/074967 6/2012

OTHER PUBLICATIONS

German Office Action and English Translation 10 2015 209 330.1, dated Sep. 22, 2015, Dialog Semiconductor (UK) Limited.
(Continued)

*Primary Examiner* — Nathaniel Pelton
(74) *Attorney, Agent, or Firm* — Saile Ackerman LLC; Stephen B. Ackerman

(57) ABSTRACT

A voltage or current regulated power converter for charging batteries, is described. The power converter comprises an inductor (L), a capacitor cell (C1, C2), switches (S1, S2, S3, S4, S5, S6, S7, S8) and a controller. The controller controls the switches such that a commutation cycle of the power converter comprises a first phase, during which the capacitor cell and the inductor are arranged in series and during which a voltage across the serial arrangement of the capacitor cell and the inductor corresponds to $V_{in}-V_{out}$; a second phase, during which the capacitor cell and the inductor are arranged in series and during which the voltage across the serial arrangement of the capacitor cell and the inductor corresponds to $-V_{out}$; and a third phase, during which the capacitor cell is floating and during which the voltage across the inductor corresponds to $V_{in}-V_{out}$ or to $-V_{out}$.

27 Claims, 9 Drawing Sheets

(58) Field of Classification Search
USPC .................................................. 320/107
See application file for complete search history.

(56) References Cited

U.S. PATENT DOCUMENTS

| | | | |
|---|---|---|---|
| 7,746,041 B2 | 6/2010 | Xu et al. | |
| 8,330,436 B2 | 12/2012 | Oraw et al. | |
| 8,519,788 B2 | 8/2013 | Khlat | |
| 8,582,333 B2 | 11/2013 | Oraw et al. | |
| 8,618,868 B2 | 12/2013 | Khlat et al. | |
| 8,619,445 B1 | 12/2013 | Low et al. | |
| 2008/0157732 A1* | 7/2008 | Williams | H02M 3/07 323/266 |
| 2013/0176076 A1* | 7/2013 | Riehl | H02M 3/156 330/127 |
| 2014/0043010 A1 | 2/2014 | Salem | |
| 2014/0184189 A1 | 7/2014 | Salem | |
| 2015/0015088 A1 | 1/2015 | Petersen | |
| 2015/0084611 A1 | 3/2015 | Agrawal et al. | |

OTHER PUBLICATIONS

"Step-Up Switching-Mode Converter With High Voltage Gain Using a Switched-Capacitor Circuit," by Oded Abutbul et al., IEEE Transactions on Circuits and Systems—I: Fundamental Theory and Applications, vol. 50, No. 8, Aug. 2003, pp. 1098-1102.
"Multi-Level Conversion: High Voltage Choppers and Voltage-Source Inverters," by T.A. Meynard et al., Power Electronics Specialists Conference, 1992. PESC '92 Record., 23rd Annual, Jun. 29-Jul. 3, 1992, pp. 397-403.
"Three-Level Buck Converter for Envelope Tracking Applications," by Vahid Yousefzadeh et al., IEEE Transactions on Power Electronics, vol. 21, No. 2, Mar. 2006, pp. 549-552.
"Flying Capacitor Voltage Balancing Method by Sensing Inductor Current," Copyright © 2016 Virginia Tech Center for Power Electronics Systems, p. 1, found: http://www.cpes.vt.edu/public/showcase/D3.2_2010.php.
"A New Approach to Reducing Output Ripple in Switched-Capacitor-Based Step-Down DC-DC Converters," by Jifeng Han et al, IEEE Transactions on Power Electronics, vol. 21, No. 6, Nov. 2006, pp. 1518 1555.
"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.
A Fully-Integrated Switched-Capacitor 2:1 Voltage Converter with Regulation Capability and 90% Efficiency at 2.3A/mm2, by Lei and Chang et al., 2010 IEEE Symposium on VLSI Circuits (VLSIC), Jun. 16-18, 2010, pp. 55-56.
"Three level buck converter with improved dynamic performance using linear-non linear control," by Reshma. P.S et al., International Journal of Innovative Research in Electrical, Electronics, Instumentation and Control Engineering, vol. 2, Issue 3, Mar. 2014 pp. 1189-1192.
"Design of a Fuly Integrated Three-Level Buck Converter," by Y. Neelima et al., International Journal of Engineering Sciences & Research Technology, Aug. 2014, pp. 701-704.
"The Cascade Connection of Switching Regulators," by Hirofumi Matsuo et al., IEEE Transactions on Industry Applications, vol. IA-12, No. 2, Mar./Apr. 1976, pp. 192-198.
"Two-Stage Voltage Regulator for Laptop Computer CPUs and the Corresponding Advanced Control Schemes to Improve Light-Load Performance," by Jia Wei et al., Applied Power Electronics Conference and Exposition, Feb. 2004. Nineteenth Annual IEEE (vol. 2 ) pp. 1294-1300.
"High Power Density, High Efficiency System Two-stage Power Architecture for Laptop Computers," by Julu Sun et al., Power Electronics Specialists Conference, 2006. PESC '06. 37th IEEE, Jun. 2006, 7 pgs.
"Merged Two-Stage Power Converter Architecture with Soft Charging Switched-Capacitor Energy Transfer," by Robert C.N. Pilawa-Podgurski, et al., Power Electronics Specialists Conference, 2008. PESC 2008. IEEE, Jun. 2008, pp. 4008-4015.
High-Efficiency, Regulated Charge Pumps for High-Current Applications, by Brigitte Kormann, Copyright 2002, Texas Instruments Incorporated, pp. 4-1 to 4-14.
"Switched-Capacitor Converters with Multiphase Interleaving Control," by Sitthisak Kiratipongvoot et al., Energy Conversion Congress and Exposition (ECCE), 2011 IEEE, Sep. 2011. pp. 1156 1161.

* cited by examiner

600 ─╲

┌─ 601
| Controlling the plurality of switches such that a
| commutation cycle of the power converter comprises
| a first phase, during which the capacitor cell and
| the inductor are arranged in series and during which
| a voltage across the serial arrangement of the
| capacitor cell and the inductor corresponds to $V_{in}$

┌─ 602
| Controlling the plurality of switches such that the
| commutation cycle of the power converter comprises
| a second phase, during which the capacitor cell and
| the inductor are arranged in series and during which
| the voltage across the serial arrangement of the
| capacitor cell and the inductor corresponds to $-V_{out}$

┌─ 603
| Controlling the plurality of switches such that the
| commutation cycle of the power converter comprises
| a third phase, during which the capacitor cell is
| floating and during which the voltage across the
| inductor corresponds to $V_{in} - V_{out}$ or to $-V_{out}$

HIGH EFFICIENCY SWITCHING CHARGER WITH REDUCED INPUT VOLTAGE RIPPLE

TECHNICAL FIELD

The present document relates to power converters with regulated output voltage or output current. In particular, the present document relates to switched power converters for charging applications.

BACKGROUND

The efficiency of a conventional switched power converter, such as a buck converter, is dominated by the losses within the switches (e.g. field effect transistors, FETs) and the inductor of the power converter. If the power converter is supplied from a relatively high input voltage Vin, the power converter typically exhibits a reduced conversion efficiency, because the switches must be implemented in high voltage technology, and thus the switches have an increased switch area and increased reverse recovery losses. Relatively large FETs typically cause relatively high switching losses, because of an increased gate charge and LX capacitance.

The voltage which is applied to the inductor of a buck converter is proportional to the difference between the input voltage $V_{in}$ and the output voltage $V_{out}$, i.e. $V_{in}-V_{out}$, during the magnetization phase, or proportional to $-V_{out}$ during the demagnetization phase. Increased inductor voltages cause increased current variations dI/dt and thus an increased switching frequency (for achieving a pre-determined current ripple) and/or an increased current ripple (for a given switching frequency). In both cases this leads to increased inductor core losses and to an increased dissipation power.

Maintaining low current variations $dI_L/dt$ at increased input and output voltages typically requires inductors (i.e. coils) with increased inductance L, due to the relation $dI_L/dt=V_L/L$. However coils with an increased inductance L have an increased number of turns. For inductors to maintain their Direct Current Resistance (DCR) even with an increased number of turns, each turn has to make use of a wire with an increased thickness to compensate for the impedance increase. Thus the size of the inductor is growing twice with an increased inductance L (due to the increased number of turns and due to the increased wire thickness). On the other hand, if the inductor dimensions are not increased, an increased inductance L leads to the effect that the DCR of the inductor is growing twice due to the additional number of turns and due to the use of a thinner wire.

Over the last years battery powered applications (like smartphones and tablets) increased their computing power, screen resolution and display frame rate and added connected standby modes. This caused an increased drain of the battery of such devices, so that electronic devices such as smartphones typically need to be re-charged on a daily basis. The limited mobility time of battery powered electronic devices may be addressed by using battery packs with an increased capacity, but a re-charge of such battery packs requires relatively long time intervals. This is caused by the fact that most of the electronic devices are charged through a standard (Micro) USB port, which provides limited current handling capability (~1.5 A). Therefore a 5 Ah battery pack requires multiple hours for re-charging, even if the battery technology (typically LiIon/LiPolymer) would allow a re-charge within less than one hour (1-2 C charging).

Recent changes in the USB charging specification allow voltages higher than the standard 5V, enabling more than four times the power from the USB supply (9V, 12V and 20V). However, due to the fact that electronic devices are space and height constrained (especially regarding the inductors used for switched power converters), an increased input voltage $V_{in}$ of a power converter (provided e.g. via the USB port) cannot be compensated by using inductors of higher inductance L. As a result of this, either the DCR of the inductor is increased or the switching frequency has to be increased. Both measures lead to an increased dissipation power and possibly hot spots at the housing of an electronic device.

SUMMARY

The present document addresses the above mentioned technical problem. In particular, the present document addresses the technical problem of providing a power converter for relatively high input voltages and/or for relatively high conversion ratios, with reduced size and with reduced power dissipation. According to an aspect, a power converter (notably a switched power converter) configured to derive electrical power at an output voltage $V_{out}$ at the output of the power converter from electrical power at an input voltage $V_{in}$ at the input of the power converter is described. The input and the output of the power converter typically comprise a positive and a negative contact, respectively. The input voltage may correspond to the voltage between the positive contact and the negative contact at the input. The output voltage may correspond to the voltage between the positive contact and the negative contact at the output. The power converter may be particularly adapted to charge a battery. In particular, the power converter may be adapted to provide a substantially constant charging current (e.g. the reference current $I_{ref}$) to a battery. The power converter comprises an inductor (also referred to as a coil) and a capacitor cell (comprising a capacitor or corresponding to a capacitor or comprising a capacitive voltage divider), a plurality of switches (each comprising e.g. one or more metaloxide semiconductor transistors) and a controller (comprising e.g. a processor).

The controller is configured to control the plurality of switches such that a commutation cycle of the power converter comprises a first phase, during which the capacitor cell and the inductor are arranged in series. Furthermore, during the first phase a magnitude of a voltage across the serial arrangement of the capacitor cell and the inductor corresponds to the magnitude of $(V_{in}-V_{out})$. In particular, the voltage across the serial arrangement of the capacitor cell and the inductor may correspond to $V_{in}-V_{out}$. In other words, during the first phase, the serial arrangement of the capacitor cell and the inductor may be arranged between the input voltage (and the input of the power converter) on one side and the output voltage (and the output of the power converter) on the other side. As a result of this, the capacitor cell may be charged during the first phase.

Furthermore, the controller is configured to control the plurality of switches such that the commutation cycle of the power converter comprises a second phase, during which the capacitor cell and the inductor are arranged in series. Furthermore, during the second phase the magnitude of the voltage across the serial arrangement of the capacitor cell and the inductor corresponds to the magnitude of $V_{out}$. In particular, the voltage across the serial arrangement of the capacitor cell and the inductor may correspond to $-V_{out}$. In other words, the serial arrangement of the capacitor cell and the inductor may be arranged in parallel to the output voltage (and to the output of the power converter). As a result of this, the capacitor cell may be discharged during the second phase.

In addition, the controller is configured to control the plurality of switches such that the commutation cycle of the power converter comprises a third phase, during which the capacitor cell is decoupled from the output of the power converter (e.g. the capacitor cell may be floating). During the third phase the magnitude of the voltage across the inductor may correspond to the magnitude of $(V_{in}-V_{out})$ or to the magnitude of $V_{out}$. In particular, the voltage across the inductor may correspond to $V_{in}-V_{out}$ or to $-V_{out}$. As such, the third phase may comprise a first variant during which the inductor is coupled to the input voltage (on one side of the inductor) and to the output voltage (on the other side of the inductor) and a second variant during which the inductor is coupled to ground and to the output voltage, i.e. during which the inductor is arranged in parallel to the output of the power converter.

The output voltage may be regulated to a predetermined reference voltage, e.g. $V_{ref}=V_{in}/2$. $V_{out}$ can be any voltage smaller than $V_{in}$, but the controller typically regulates the duty cycle of the first and second phase such that the voltage over the capacitor $V_c$ across the capacitor cell is $\sim V_{in}/2$. Highest converter efficiency can typically be achieved for $V_{out}=V_c=V_{in}/2$). The controller may be configured to set the duration of the first, second and third phase during a commutation cycle (i.e. the duty cycle), such that the output voltage of the power converter is regulated to the predetermined reference voltage $V_{ref}$.

The third phase may be used to regulate the (average) output current of the power converter to a pre-determined reference current $I_{ref}$. For this purpose, the output current of the power converter may be sensed using current sensing means, wherein the current sensing means may make use of current sensing technologies such as matched filters and/or current mirroring. The output current at the end of the first and/or second phase may be sensed. In particular, the cumulated and/or average output current at the end of the first and/or second phase may be sensed. Furthermore, it may be determined whether the (cumulated/average) output current at the end of the first and/or second phase is greater than or smaller than the pre-determined reference current $I_{ref}$. Depending on this comparison, the first or the second variant may be used for a third phase that follows the first and/or the second phase. In particular, the first variant may be used if the output current is below the pre-determined reference current $I_{ref}$ and the second variant may be used if the output current is above the pre-determined reference current $I_{ref}$.

The controller may be configured to set a duration of the third phase such that at the end of the third phase, the (average) output current is equal to or greater than the reference current $I_{ref}$, notably if the (average) output current $I_{out}$ at the end of the first phase and/or at the end of the second phase is smaller than the reference current $I_{ref}$. Alternatively or in addition, the controller may be configured to set a duration of the third phase such that at the end of the third phase, the (average) output current $I_{out}$ is equal to or smaller than the reference current $I_{ref}$, notably if the (average) output current $I_{out}$ at the end of the first phase and/or at the end of the second phase is greater than the reference current $I_{ref}$. By doing this, a precise regulation of the output current may be achieved.

The power converter enables the use of relatively small inductors. Furthermore, the power converter enables a reduction of the voltage variations across the inductor. Hence, the power converter allows the reduction of the size of the power converter and of the power dissipation of the power converter.

The controller may be configured to control the plurality of switches such that within a commutation cycle subsequent to the first phase and/or subsequent to the second phase, the power converter is operated in the third phase. By inserting the third phase subsequent to the first phase and subsequent to the second phase, the input voltage ripple may be reduced.

The controller may be configured to set a duty cycle of a commutation cycle such that the input voltage $V_{in}$ is greater or equal to $2V_{out}$. In particular, the duty cycle of a commutation cycle may be controlled such that the output voltage corresponds (in average) to the reference voltage $V_{ref}$, e.g. half of the input voltage. The duty cycle may correspond to or may depend on the ratio of the duration of the first phase and the duration of a complete commutation cycle which comprises the first phase, the second phase and possibly one or more third phases.

The power converter may comprise a first sub-converter comprising a first plurality of switches (e.g. a subset of the total plurality of switches) and a first capacitor cell (e.g. a first capacitor). Furthermore, the power converter may comprise a second sub-converter comprising a second plurality of switches (e.g. a subset of the total plurality of switches) and a second capacitor cell (e.g. a second capacitor).

The first and second sub-converters may be operated in an interleaved manner, thereby reducing the ripple of the input voltage/input current. In particular, the controller may be configured to control the first and second pluralities of switches such that the first and second sub-converters are operated in an interleaved manner. The interleaved operation may be such that during the first phase, the second capacitor cell is discharged, that during the second phase, the first capacitor cell is discharged, and that during the third phase, the first capacitor cell and the second capacitor cell are decoupled from the output (e.g. floating). Furthermore, during the first phase, the first capacitor cell may be charged and during the second phase, the second capacitor cell may be charged (as illustrated e.g. in the example shown in FIG. 1$b$). Alternatively, the first and second capacitor cells may be continuously charged during the first and second phases with the same current (as illustrated e.g. in the example shown in FIG. 4$a$).

Furthermore, the controller may be configured to control the first and second pluralities of switches such that during the first phase and during the second phase, the first capacitor cell is arranged in series with the inductor and the second capacitor cell is arranged in series with the inductor. As such, the current through the inductor is provided by the first and the second capacitor cell. As such, the power converter may comprise only a single inductor for the first sub-converter and for the second sub-converter. By doing this, the size of the power converter may be further reduced.

The first plurality of switches may comprise a first switch configured to (directly) couple a first side of the first capacitor cell to the input voltage, a second switch configured to (directly) couple the first side of the first capacitor cell to the inductor, a third switch configured to (directly) couple a second side of the first capacitor cell to the inductor, and a fourth switch configured to (directly) couple the second side of the first capacitor cell to ground. Furthermore, the second plurality of switches may comprise an $8^{th}$ switch configured to (directly) couple a first side of the second capacitor cell to the input voltage, a $7^{th}$ switch configured to (directly) couple the first side of the second capacitor cell to the inductor, a $6^{th}$ switch configured to (directly) couple a second side of the second capacitor cell to the inductor, and a $5^{th}$ switch configured to (directly) couple the second side of the second capacitor cell to ground.

Alternatively, the first and the second capacitor cells may be arranged in series between the positive contact and the negative contact of the input of the power converter. A first end of the first capacitor cell may be coupled to the positive contact of the input of the power converter, a second end of the first capacitor cell may be coupled to a first end of the second capacitor cell, and a second end of the second capacitor cell may be coupled to the negative contact of the input of the power converter. The plurality of switches may comprise a first switch configured to (directly) couple the second end of the first capacitor cell to the inductor, a second switch configured to (directly) couple the second end of the first capacitor cell to ground and/or the negative contact of the output of the power converter, a third switch configured to (directly) couple the second end of the second capacitor cell to the negative contact of the output of the power converter, and a fourth switch configured to (directly) couple the first end of the first capacitor cell to the inductor. As such, an interleaved operation of two sub-converters may be implemented with a reduced number of switches, thereby reducing the size and power dissipation of the power converter. In particular, the two sub-converters, which comprise the two capacitor cells respectively, make use at least partially of and/or may comprise at least partially the same switches.

The power converter may comprise a first inductor and a second inductor. The controller may be configured to control the plurality of switches such that during a first fraction of the first phase and a first fraction of the second phase, the capacitor cell is arranged in series with the first inductor, while the second inductor is coupled to ground. Furthermore, the controller may be configured to control the plurality of switches such that during a second fraction of the first phase and a second fraction of the second phase, the capacitor cell is arranged in series with the second inductor, while the first inductor is coupled to ground. Furthermore, during a further fraction of the first phase and/or the second phase, the first inductor and the second inductor may be arranged in parallel to one another and in series with the capacitor cell. By splitting up the inductor into a first inductor and a second inductor, the conversion efficiency of the power converter may be further increased.

As indicated above, a capacitor cell may comprise a single capacitor. Alternatively, a capacitor cell may comprise a capacitive voltage divider, e.g. a Dickson voltage divider, comprising a plurality of capacitors. By doing this, various different reference voltages $V_{ref}$ for the output voltage, e.g. $V_{ref}=2V_{in}/3$, $V_{in}/3$, $V_{in}/4$, etc., may be provided. The reference voltage $V_{ref}$ indicates the output voltage for which the different power converters operate with optimum efficiency. Furthermore, the reference voltage $V_{ref}$ indicates the output voltage, at which the third phase of operation of the power converter typically changes from a first variant to a second variant or vice versa.

An inductance L of the inductor measured in Henrys may be smaller than the capacitance C of the capacitor measured in Farads by at least one or two orders of magnitude. As such, a small sized, power efficient power converter may be provided.

According to a further aspect, a cascaded power converter is described. The cascaded power converter comprises a power converter as described in the present document. Furthermore, the cascaded power converter comprises a capacitive voltage divider stage configured to derive the input voltage for the power converter from a global input voltage, wherein the global input voltage is greater than the input voltage. A commutation cycle of the capacitive voltage divider stage may be synchronized with a commutation cycle of the power converter. Furthermore, a frequency of the commutation cycle of the capacitive voltage divider stage may be k times smaller than a frequency of the commutation cycle of the power converter, with k being a positive integer. By using a cascaded power converter, the power efficiency of a power converter may be optimized for conversion ratios of 0.25 and below.

According to another aspect, a method for operating a controller of a power converter as outlined in the present document is described. The method may comprise steps which correspond to the features of the controller and power converter described in the present document. The method is directed at controlling the switches of a power converter, wherein the power converter is configured to derive electrical power at an output voltage $V_{out}$ from electrical power at an input voltage $V_{in}$, wherein the power converter comprises an inductor and a capacitor cell and a plurality of switches. The method comprises controlling the plurality of switches such that a commutation cycle of the power converter comprises a first phase, during which the capacitor cell and the inductor are arranged in series and during which a voltage across the serial arrangement of the capacitor cell and the inductor corresponds to $V_{in}-V_{out}$. Furthermore, the method comprises controlling the plurality of switches such that the commutation cycle of the power converter comprises a second phase, during which the capacitor cell and the inductor are arranged in series and during which the voltage across the serial arrangement of the capacitor cell and the inductor corresponds to $-V_{out}$. In addition, the method comprises controlling the plurality of switches such that the commutation cycle of the power converter comprises a third phase, during which the capacitor cell is floating and during which the voltage across the inductor corresponds to $V_{in}-V_{out}$ or to $-V_{out}$.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein

FIG. 6 shows a flow chart of an example method for controlling a power converter.

DESCRIPTION

Figure 1A:
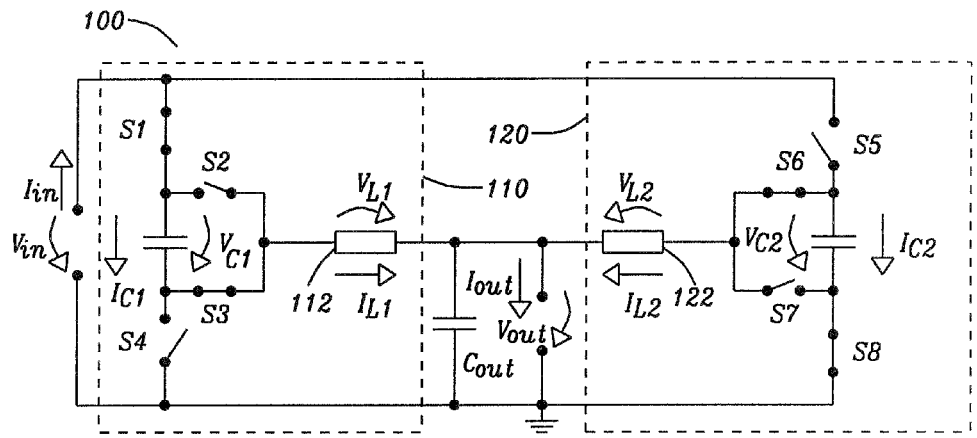
FIGS. 1a and 1b illustrate example power converters.

As outlined above, the present document addresses the technical problem of providing power converters which are configured to cope with an increased input voltage $V_{in}$ and/or an increased input power, and which nonetheless have a limited size and limited power dissipation.

In particular, the present document is directed at increasing battery charging conversion efficiency (wired or wireless) to >93% in order to reduce dissipation power to a range that can be handled without overheating an electronic device. In this context, the negative impact on the efficiency caused by charger supply voltages that are significantly higher than the battery pack voltage is addressed. The challenge here is to operate within the space constraints of a target electronic device, which typically requires the use of relatively small inductors. Furthermore, the input voltage ripple which is due to relatively low switching frequencies should be reduced for limited ringing and EMI emission from the wires to the power supply of the electronic device.

As indicated above, the present document is particularly focused on battery charging. It should be noted, however, that the disclosure of the present document also applies to all applications that require DC-DC step buck type conversion at high efficiency, notably if, because of space constraints, low switching frequency cannot be achieved through high inductance coils.

A possibility to cope with an increased input voltage is to make use of a cascaded number of buck converters. However, the efficiencies of cascaded stages are multiplied, which results in a reduced overall efficiency in addition to a cost and area overhead. The drawbacks of cascaded converters can be reduced by using unregulated switched capacitor voltage division within at least one of the stages, as capacitors are much smaller than inductors with similar energy storage capacity and the conversion efficiency can be up to 98-99%. A limitation of cascaded buck converters is the maximum conversion ratio, which is always less than the conversion ratio of each stage. So in case of switched capacitive division, the maximum conversion ratio of the overall regulator is less than the conversion ratio of the divider cell (e.g. conversion ration D<0.5, when using a 2:1 capacitive divider stage). This disables the usage of cascaded converters for certain applications.

A further possibility is the use of multi-level buck converters. A multi-level buck converter typically requires twice the amount of switches than a standard buck converter. However, at least the bottom and mid switches (relative to ground) of a multi-level buck converter are not exposed to voltages higher than $V_{in}/2$, which enables the usage of FETs with reduced voltage ratings, providing lower on-resistances $R_{dson}$ at similar parasitic capacitance and reduced reverse recovery loss. The reduced switching frequency of a multi-level buck converter improves the efficiency, but the duration of time intervals, when there's no current drawn from the input is extended. For a 2:1 conversion ratio the full output current is pulled from the input rail at a duty cycle of ~50%. In case of a USB charger this increases the input voltage ripple, because the maximum termination capacitance is restricted by the USB specifications.

FIG. 1a shows an interleaved 3-level buck converter 100. The interleaved 3-level buck converter 100 comprises two instances or two sub-converters 110, 120 of a 3-level buck converter 100 which are operated in an interleaved manner, thereby reducing the input voltage ripple. The structure of FIG. 1a can be compacted (see FIG. 1b) by making use of a single inductor 104, instead of the separate inductors 112, 122 for the instances 112, 120, respectively, thereby reducing the size of the interleaved 3-level buck converter 150, compared to the interleaved 3-level buck converter 100.

Figure 1B:
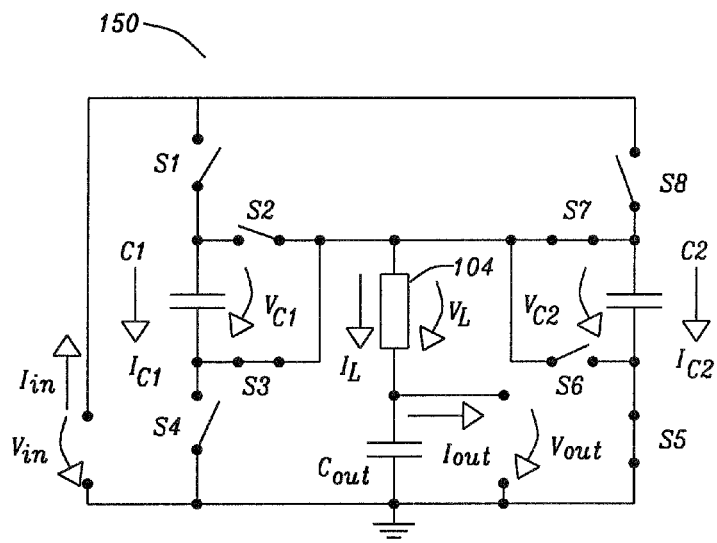

The power converter 150 of FIG. 1b reduces input voltage ripple caused by limited input capacitance at low switching frequency. Furthermore, the power converter 150 requires only a single inductor 104.

Figure 2A:
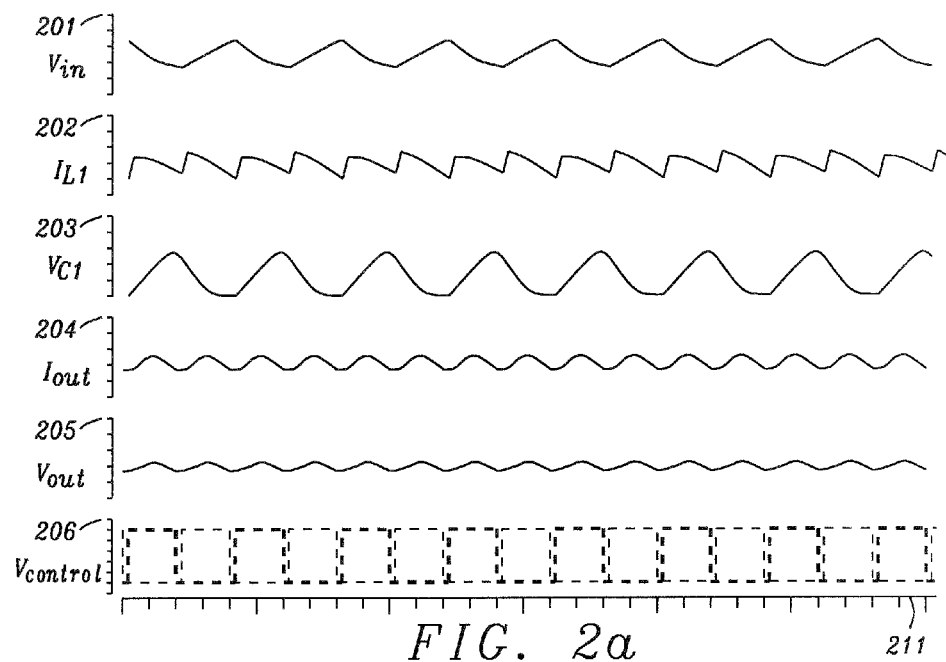
FIGS. 2a and 2b illustrate example voltages and currents at a power converter.
Figure 2B:
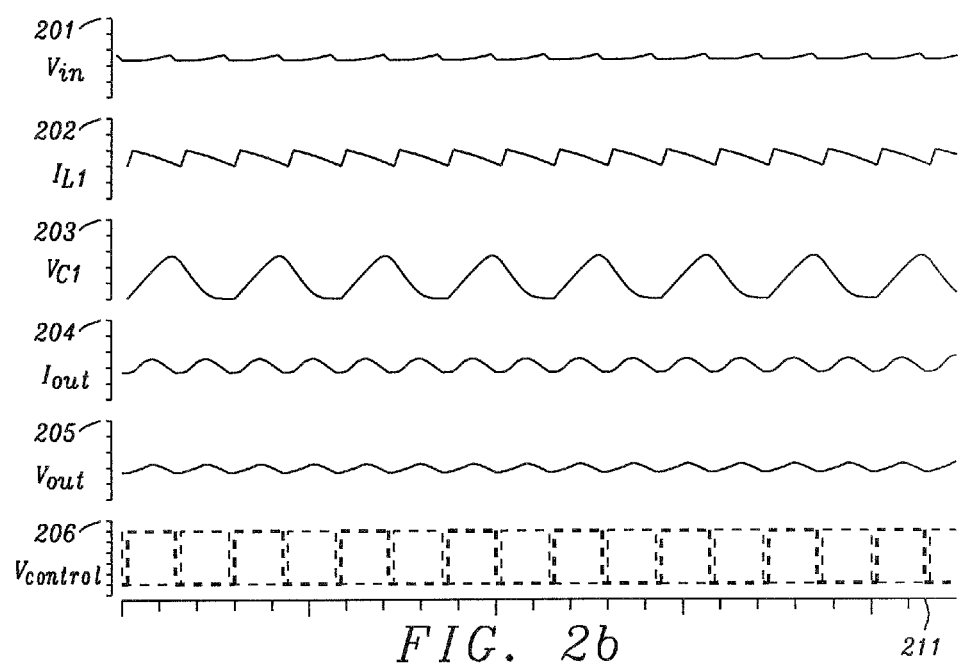

FIG. 2a shows an example input voltage $V_{in}$ 201, inductor current $I_{L1}$ 202, capacitor voltage $V_{C1}$ 203 at the capacitor C1 111, output current $I_{out}$ 204, output voltage $V_{out}$ 205 and the control voltage 206 for the switches of the converter 110. FIG. 2b shows an example input voltage $V_{in}$ 201, inductor current $I_L$ 202, capacitor voltage $V_{C1}$ 203 at the capacitor C1 111, output current $I_{out}$ 204, output voltage $V_{out}$ 205 and the control voltage 206 for the switches of the converter 150. It can be seen that using the same total switch area, the voltage ripple of the input voltage 201 can be reduced to less than 10%, when using the converter 150. Furthermore, a symmetric shape of the inductor current ripple can be achieved when using the converter 150. In contrast to this, the inductor current signal of FIG. 2a is slightly different for consecutive switching cycles. This results from the fact that one of the inductor demagnetizing phases is discharging in parallel to the switching capacitor, with the consecutive inductor demagnetizing phase charging the switching capacitance at the same time.

The power converter 150 comprises a control circuit (not shown), which is configured to control the switches S1 through S8 of the power converter 150. In particular, the switches may be operated such that the power converter 150 is put successively into different phases. Example phases are illustrated in the FIGS. 3a through 3e.

Figure 3A:
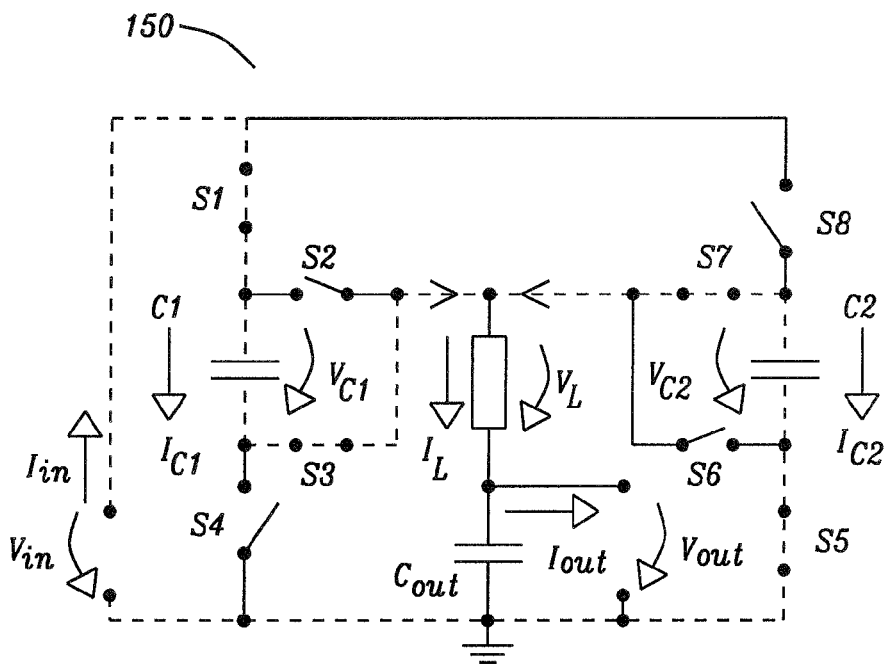
FIGS. 3a to 3e illustrate example operation phases of a power converter.

In a first phase which is illustrated in FIG. 3a all odd switches S1, S3, S5 and S7 are closed (whereas the even switches S2, S4, S6 and S8 are open). The first phase ramps the inductor current $I_L$ while charging the flying capacitor C1 from $I_{in}$ and discharging the flying capacitor C2 in parallel.

Figure 3B:
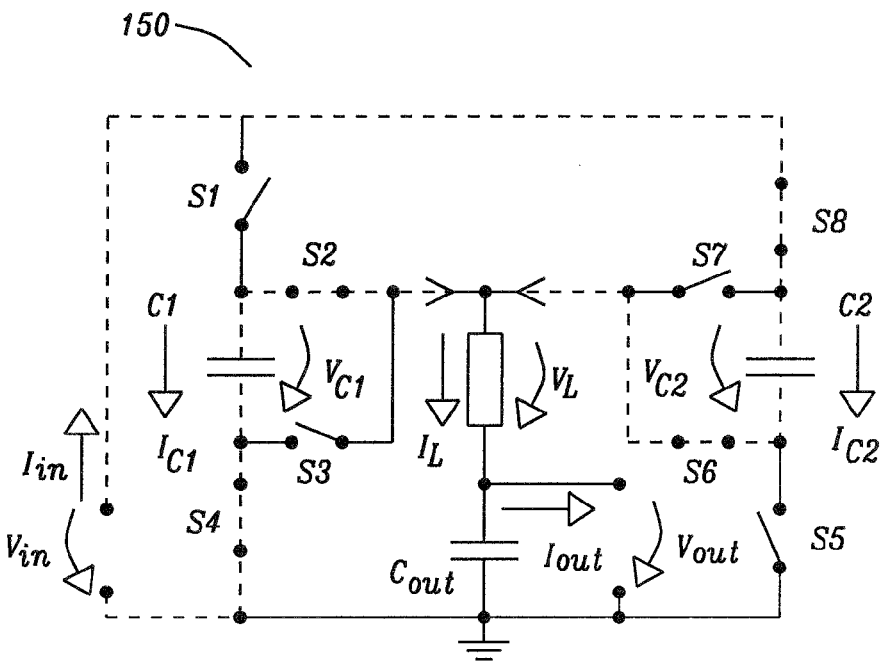

In a second phase which is illustrated in FIG. 3b all odd switches S1, S3, S5 and S7 are open, whereas the even switches S2, S4, S6 and S8 are closed. The second phase ramps the inductor current $I_L$ while charging the flying capacitor C2 from $I_{in}$ and discharging the flying capacitor C1 in parallel.

The duration of the first and/or the second phase may be controlled in a way so that the charge of both flying capacitors C1 and C2 is balanced. In case of a constant output current, this condition triggers an identical duration of the first phase and the second phase.

Furthermore, the multi-level buck converter 150 is operated in a $3^{rd}$ phase for balancing the current in the inductor L after having finished the charging and discharging of the flying capacitor network C1, C2. For a steady state condition two rules should be fulfilled over a complete commutation cycle of the converter 150:
1. The flying capacitor network charge and discharge is equal (capacitor charge and voltage is the same at the beginning and the end of a cycle), i.e. $0=\int(I_C \times dt)$.
2. The current through the inductor L is the same at the beginning and the end of the cycle, i.e. $0=\int(dI_L \times dt)$.

Figure 3C:
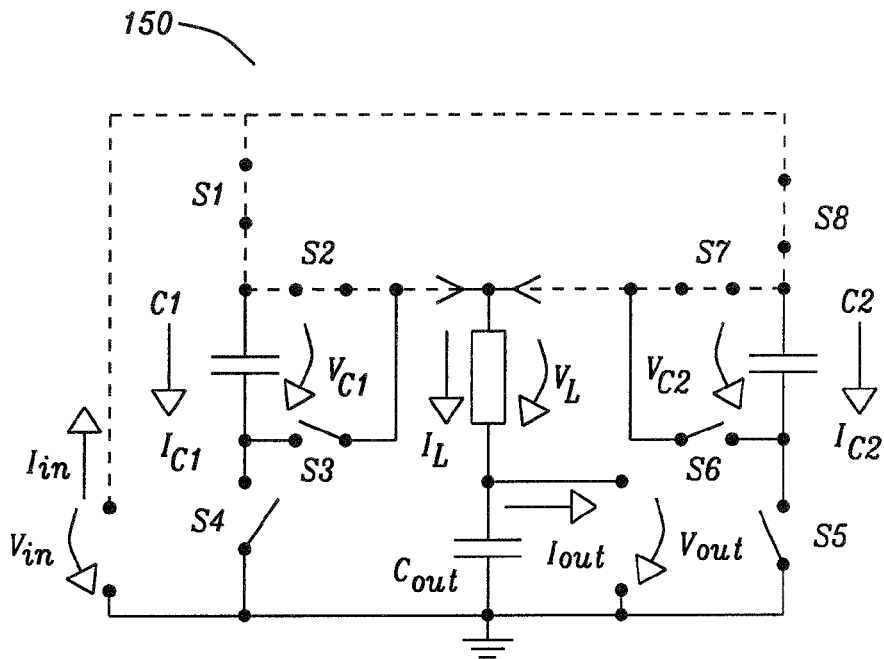
Figure 3D:
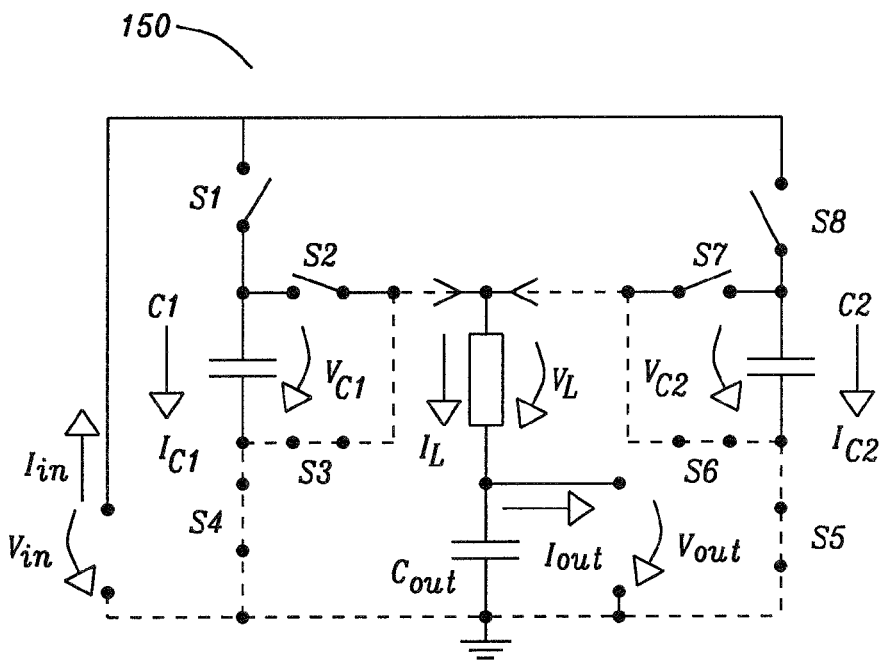
Figure 3E:
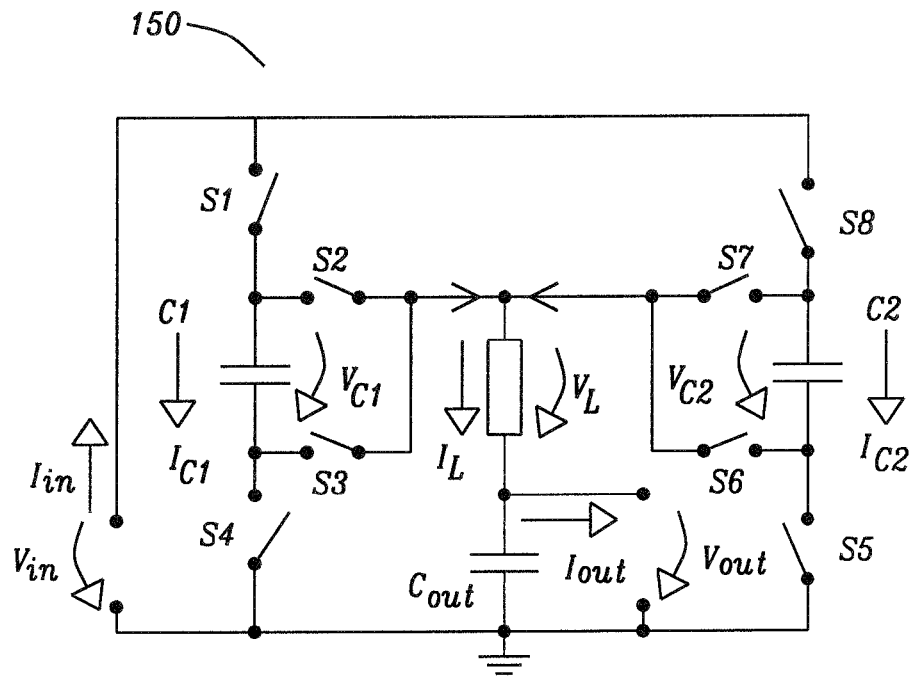

The first condition may be achieved by setting the duration of the first and second phases. The second condition may be achieved using a third phase. In particular, the second condition may be achieved by operating the power converter 150 in a first or a second variant of a third phase. The first variant of the third phase is shown in FIG. 3c and the second variant of the third phase is shown in FIG. 3d.

The third phase ramps the current through the inductor without affecting the charge of the flying capacitors C1, C2. The duration of the third phase may be regulated by the target or reference output voltage $V_{ref}$ (e.g. $V_{in}/2$) and for constant output current triggers the same inductor current $I_L$ at the beginning of each cycle (consisting of the first, second and third phase). In case $V_{in} > 2 \times V_{out}$ the configuration from FIG. 3d is typically selected (i.e. the first variant), otherwise the configuration from FIG. 3c is selected (i.e. the second variant).

The third phase may be implemented only following the second phase or, for reduced inductor current ripple, may also be inserted between the first phase and the second phase. The inductor current ripple increases with $V_{out}$ being different from its optimum value of $\frac{1}{2} \times V_{in}$. This ripple may be compensated via an increased switching frequency, but in both cases the conversion efficiency is reduced.

The converter 150 may be operated in an optional fourth phase (shown in FIG. 3e), where current through the inductor is zero and $I_{out}$ is provided by the output capacitor $C_{out}$ alone. This phase may be used in case the commutation cycle provides more average current than is pulled from the output. During the fourth phase all switches may be open (at least switches S1, S4, S5 and S8). The fourth phase may be inserted when the inductor current $I_L$ is crossing zero. The fourth phase may be referred to as a Discontinuous Conduction Mode (DCM), Pulse Frequency Modulation Mode (PFM) or Pulse Skipping Mode. The fourth phase regulates the output voltage/output current down by temporally stopping current through the inductor. The fourth phase may be terminated when $V_{out}$ (or $I_{out}$) has dropped below a minimum threshold (hysteretic control).

Figure 4A:
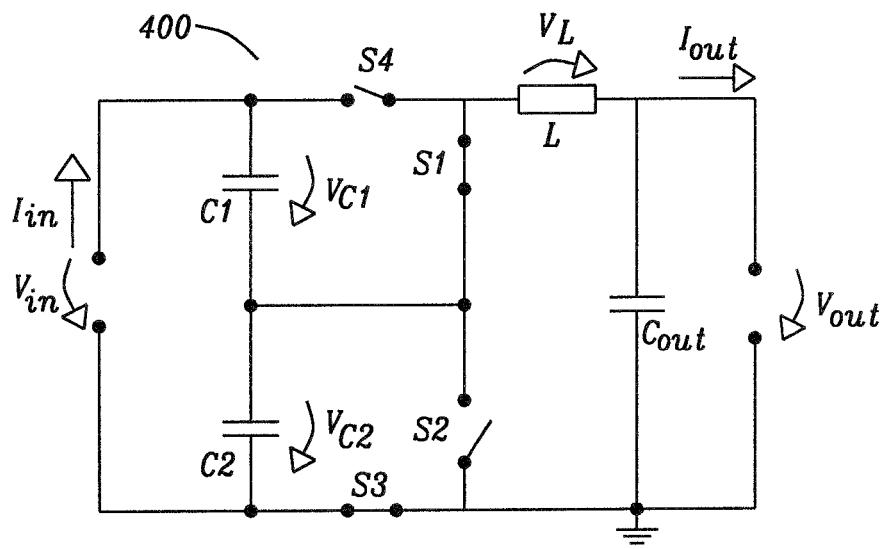
FIGS. 4a to 4f illustrate further example power converters.
Figure 4B:
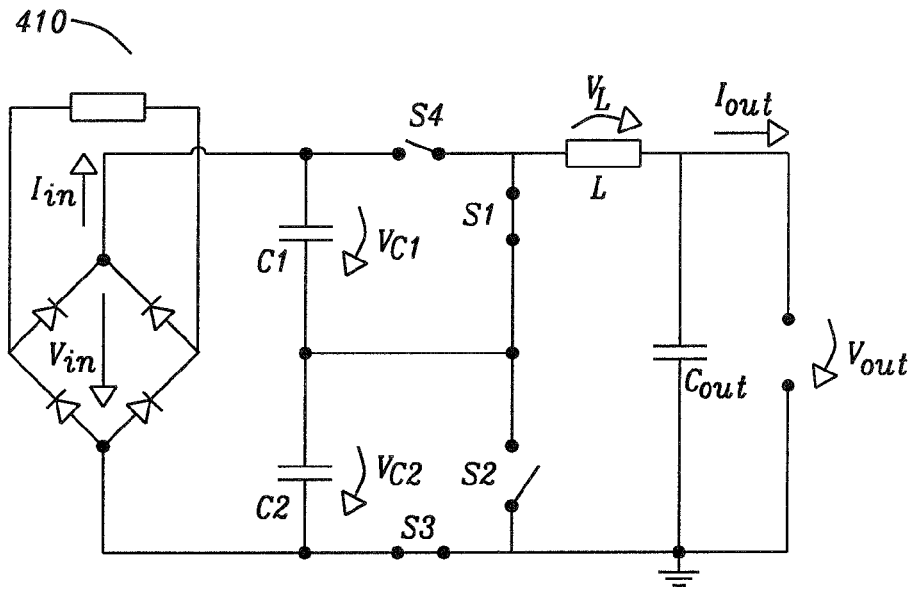

If a ground shift of the negative potential of the input voltage $V_{in}$ related to the negative potential of the output voltage $V_{out}$ is not relevant in a specific application, the circuitry 400 of FIG. 4a may be a useful variant. It implements the input ripple cancellation with a reduced number of switches compared to the power converter 150. The power converter 400 may be operated in at least three phases as outlined in the context of FIGS. 3a through 3e. A typical input for such a converter cell 400 is the rectifier output of an AC/DC transformer or a wireless charging coil as shown in the circuitry 410 of FIG. 4b.

Figure 4C:
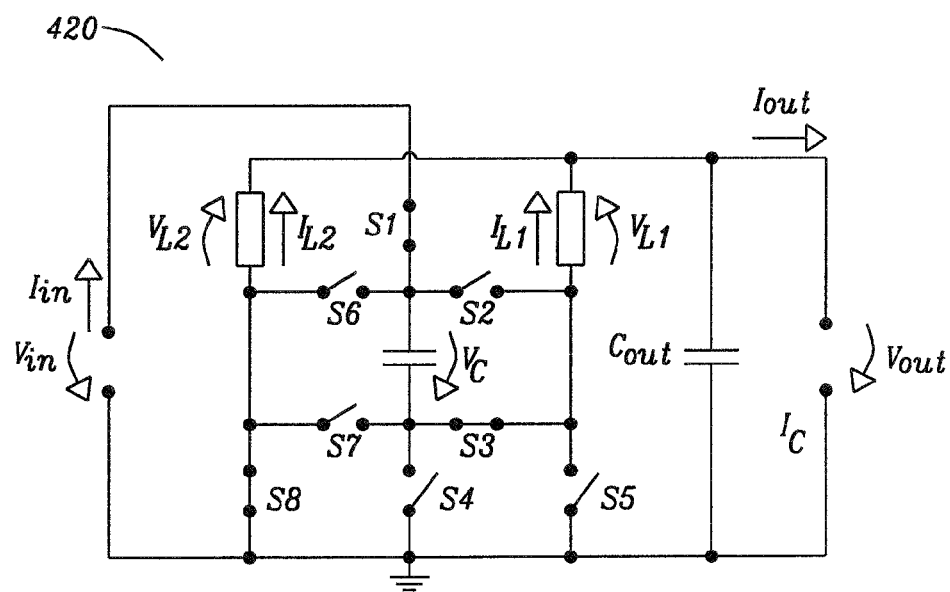

Another variant of the invented circuitry 150 of FIG. 1b is shown in FIG. 4c. A typical application for the circuitry 420 of FIG. 4c is e.g. the core supply of low voltage/high performance application processors from a multi-cell (e.g. 2-cell) battery pack (with e.g. Vbat≥6V, Vout≤1.5V). The power converter 420 may be operated in at least three phases as outlined in the context of FIGS. 3a through 3e. The phases, notably the first and the second phase, may be partitioned into different fractions during which the respective inductors are coupled in series with the capacitor. In other words, the inductors may be operated in an interleaved manner. Furthermore, the inductors may be used concurrently (e.g. during a further fraction of the first and/or of the second phases).

The architecture 420 of FIG. 4c reduces the number of switching capacitors, but uses multiple smaller inductors, each sized for a fraction of the maximum output current of the converter 420. The switches S5 and S8 to Ground enable the independent switching and/or regulation of the first and second inductors L1, L2 (including interleaved switching for ripple cancellation) and improve the conversion efficiency, notably at low output voltage. The switches S5 and S7 are arranged in a parallel connection with the switching capacitor of the converter 420. Conduction loss may be relatively low for the converter 420, because the converter 420 comprises a reduced number of switches, notably between the inductor input and the supply rails $V_{in}$ and Ground, compared to other architectures.

Figure 4D:
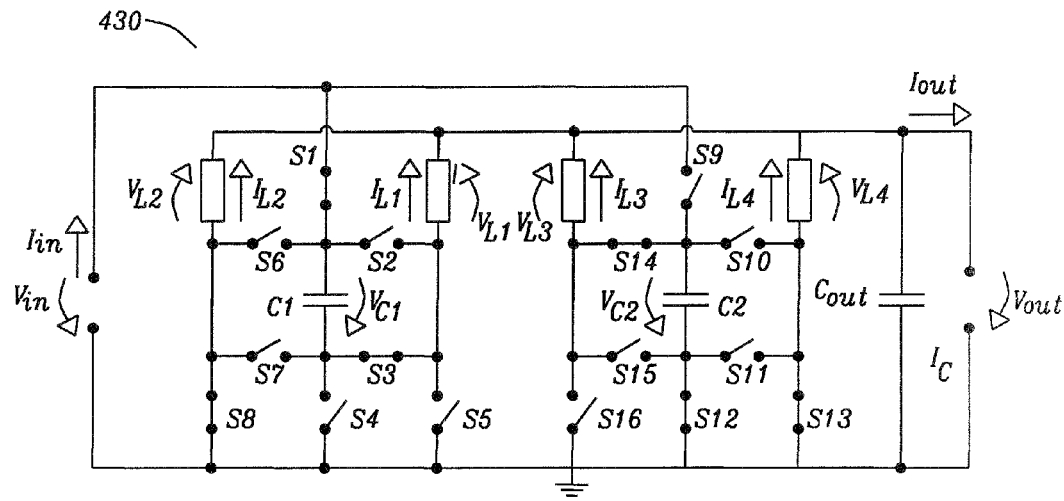

An improved input ripple cancellation may be achieved when running two cells 420 from FIG. 4c in an interleaved e.g. four inductors configuration 430 as shown in FIG. 4d.

Figure 4E:
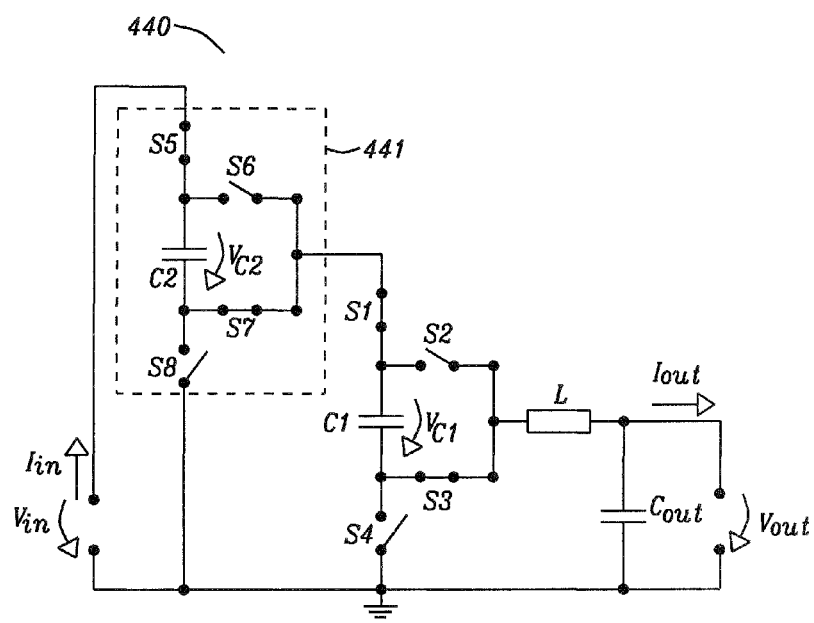

An alternative example of circuit 110 with optimized efficiency for a conversion ratio D~0.25 and below is shown as circuit 440 in FIG. 4e. The circuit 440 comprises a second level divider stage 441. The circuit 400 cascades a capacitive voltage divider-stage 441 with a multi-level buck converter 100. In a typical example, the switches S5 & S7 toggle their state in parallel with switches S6 & S8, synchronized with the switching of the multi-level buck converter at a rate that is half or 1/k of its cycle frequency. Thus the current is pulled from the input only every $2^{nd}$ (or every k) cycle of the cascaded power converter 440.

Figure 4F:
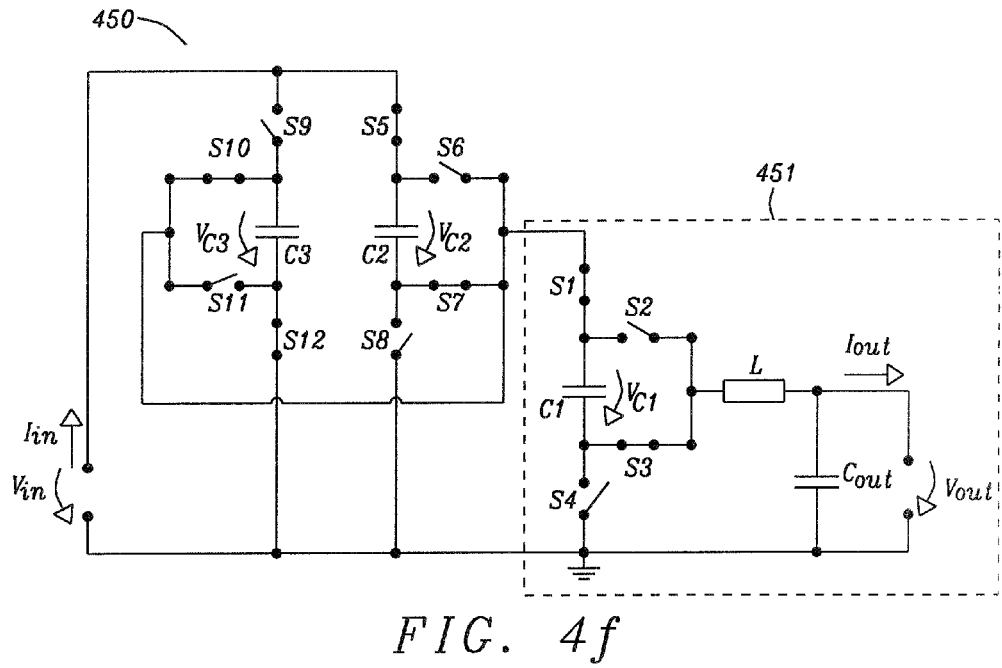

The input current ripple caused by converter periods not pulling current from the input can be reduced with another example converter 450 connecting two interleaved instances of the $2^{nd}$ level divider-stage 441 as shown in FIG. 4f. The converter 450 comprises two interleaved $2^{nd}$ level divider-stages 441 which are cascaded with a three level buck converter 110, 451. The capacitors C2 and C3 in FIG. 4f are implementing a voltage divider, each delivering ~50% of the 3-level buck converter input current (with 50% being continuously pulled from $V_{in}$).

For further reduction of input current/input voltage ripple, the above shown 3-level buck converter 451 can be replaced with power converters as shown e.g. in FIGS. 1a, 1b, 4a, 4b, 4c, and 4d. For improved efficiency at very low conversion ratios (e.g. D≤0.125) the 3-level buck converter 451 may also be replaced with circuits as shown in FIGS. 4e and 4f.

Figure 5:
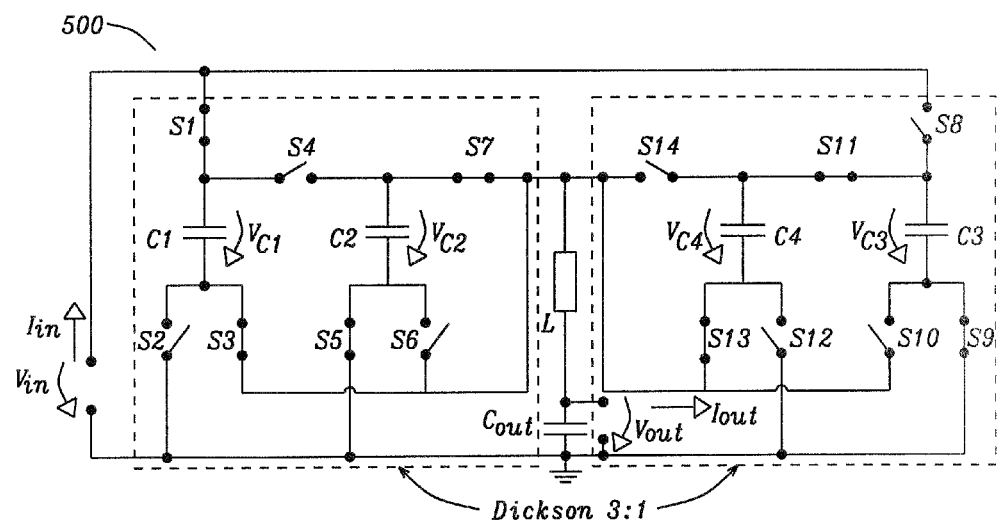
FIG. 5 illustrates a further example power converter.

The capacitive cell(s) shown in previous examples of FIGS. 1a, 1b, 4a through 4f may be replaced with other topologies like serial-parallel, Dickson, etc. topologies, thereby enabling optimum conversion efficiency also at divider ratios of e.g. 3:1, 1.5:1 (notably different to $2^n:1$). As an example, the circuit 500 of FIG. 5 replaces the switching capacitors C1 and C2 from FIG. 1a with two 3:1 cells of a Dickson topology.

The power converters described in the present document may make use of relatively low frequency switching for achieving high-efficient battery charging (wired and wireless) from input voltages which are substantially higher than the output voltage used for charging a battery pack. The input voltage ripple of the power converters may be improved using only a single small inductance at low switching frequency. The power converters may be implemented in a printed circuit board (PCB). As such, a low frequency multi-level buck converter in combination with small and low inductance coils are described for battery charging. Furthermore, low input current/input voltage ripple may be achieved from a low frequency switching multi-level buck converter in combination with a small single inductor and low input capacitance.

Using multi-level switching cells for the buck conversion of battery charging from input voltages that are substantially higher than the battery pack voltage enables low switching frequency in combination with low inductance (small size coils). The low switching frequency increases conversion efficiency (reduces dissipation power). The described architecture is adding ripple cancellation to multi-level buck converter cells without the requirement for multiple inductors. Furthermore, automatic charge regulation over the switching capacitance may be achieved, thereby removing the need for a regulation control loop.

FIG. 6 shows a flow chart of an example method 600 for controlling a power converter 150. The power converter is configured to derive electrical power at an output voltage $V_{out}$ from electrical power at an input voltage $V_{in}$ wherein the power converter 150 comprises an inductor L a capacitor cell C1, C2 and a plurality of switches S1, S2, S3, S4, S5, S6, S7, S8.

The method 600 comprises controlling 601 the plurality of switches such that a commutation cycle of the power converter 150 comprises a first phase, during which the capacitor cell and the inductor are arranged in series and during which a voltage across the serial arrangement of the capacitor cell and the inductor corresponds to $V_{in}-V_{out}$. Furthermore, the method 600 comprises controlling 602 the plurality of switches such that the commutation cycle of the power converter comprises a second phase, during which the capacitor cell and the inductor are arranged in series and during which the voltage across the serial arrangement of the capacitor cell and the inductor corresponds to $-V_{out}$. In addition, the method 600 comprises controlling 603 the plurality of switches such that the commutation cycle of the power converter comprises a third phase, during which the capacitor cell is floating and during which the voltage across the inductor corresponds to $V_{in}-V_{out}$ or to $-V_{out}$. By controlling the power converter according to method 600, the ripple of the input voltage/input current may be reduced. Furthermore, the use of a capacitor cell in conjunction with an inductor enables the use of inductors of reduced inductance, thereby providing power converters of reduced size. In addition, the power dissipation of the power converter may be reduced.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A voltage or current regulated power converter for charging a battery, wherein the power converter is configured to derive electrical power at an output voltage $V_{out}$ at an output of the power converter for charging the battery from electrical power at an input voltage $V_{in}$ at an input of the power converter, wherein the power converter comprises an inductor (L), a capacitor cell, a plurality of switches (S1, S2, S3, S4, S5, S6, S7, S8) and a controller; wherein the capacitor cell comprises a single capacitor or a capacitive voltage divider; wherein the controller is configured to control the plurality of switches such that a commutation cycle of the power converter comprises
   a first phase, during which the capacitor cell and the inductor are arranged in series between the input and the output of the power converter;
   a second phase, during which the capacitor cell and the inductor are arranged in series parallel to the output of the power converter; and
   a third phase, during which the capacitor cell is decoupled from the output of the power converter; during which a charge of the capacitor remains unaffected and during which the inductor is arranged between the input and the output of the power converter or parallel to the output of the power converter.

2. The power converter of claim 1, wherein the controller is configured to control the plurality of switches such that within a commutation cycle subsequent to the first phase and/or subsequent to the second phase, the power converter is operated in the third phase.

3. The power converter of claim 2, wherein the controller is configured to
   determine an output current $I_{out}$ at the end of the first phase and/or at the end of the second phase;
   control the plurality of switches during the third phase such that the inductor is arranged between the input and the output of the power converter, if the output current $I_{out}$ at the end of the first phase and/or at the end of the second phase is smaller than a reference current $I_{ref}$; and
   control the plurality of switches during the third phase such that the inductor is arranged parallel to the output of the power converter, if the output current $I_{out}$ at the end of the first phase and/or at the end of the second phase is greater than the reference current $I_{ref}$.

4. The power converter of claim 3, wherein the controller is configured to set a duration of the third phase such that at the end of the third phase,
   the output current $I_{out}$ is equal to or greater than the reference current $I_{ref}$ if the output current $I_{out}$ at the end of the first phase and/or at the end of the second phase is smaller than a reference current $I_{ref}$; and
   the output current $I_{out}$ is equal to or smaller than the reference current $I_{ref}$ if the output current $I_{out}$ at the end of the first phase and/or at the end of the second phase is greater than the reference current $I_{ref}$.

5. The power converter of claim 1, wherein,
   during the first phase, the capacitor cell is charged;
   during the second phase, the capacitor cell is discharged.

6. The power converter of claim 1, wherein,
   the power converter comprises a first sub-converter comprising a first plurality of switches (S1, S2, S3, S4) and a first capacitor cell;
   the power converter comprises a second sub-converter comprising a second plurality of switches (S5, S6, S7, S8) and a second capacitor cell;

the controller is configured to control the first and second pluralities of switches such that the first and second sub-converters are operated in an interleaved manner, such that
during the first phase, the second capacitor cell is discharged;
during the second phase, the first capacitor cell is discharged; and
during the third phase, the first capacitor cell and the second capacitor cell are decoupled from the output voltage.

7. The power converter of claim 6, wherein the controller is configured to control the first and second pluralities of switches such that during the first phase and during the second phase, the first capacitor cell is arranged in series with the inductor and the second capacitor cell is arranged in series with the inductor.

8. The power converter of claim 6, wherein the power converter comprises only a single inductor for the first sub-converter and for the second sub-converter.

9. The power converter of claim 6, wherein
the first plurality of switches comprises a first switch (S1) configured to couple a first side of the first capacitor cell to the input voltage, a second switch (S2) configured to couple the first side of the first capacitor cell to the inductor, a third switch (S3) configured to couple a second side of the first capacitor cell to the inductor, and a fourth switch (S4) configured to couple the second side of the first capacitor cell to ground;
the second plurality of switches comprises an 8$^{th}$ switch (S8) configured to couple a first side of the second capacitor cell to the input voltage, a 7$^{th}$ switch (S7) configured to couple the first side of the second capacitor cell to the inductor, a 6$^{th}$ switch (S6) configured to couple a second side of the second capacitor cell to the inductor, and a 5$^{th}$ switch (S5) configured to couple the second side of the second capacitor cell to ground.

10. The power converter of claim 6, wherein
the first and the second capacitor cells are arranged in series between a positive and negative contact of the input voltage;
a first end of the first capacitor cell is coupled to the positive contact of the input voltage;
a second end of the first capacitor cell is coupled to a first end of the second capacitor cell;
a second end of the second capacitor cell is coupled to the negative contact of the input voltage;
the plurality of switches comprises
a first switch (S1) configured to couple the second end of the first capacitor cell to the inductor,
a second switch (S2) configured to couple the second end of the first capacitor cell to ground,
a third switch (S3) configured to couple the second end of the second capacitor cell to ground, and
a fourth switch (S4) configured to couple the first end of the first capacitor cell to the inductor.

11. The power converter of claim 1, wherein
the power converter comprises a first inductor and a second inductor;
the controller is configured to control the plurality of switches such that
during a first fraction of the first phase and/or a first fraction of the second phase, the capacitor cell is arranged in series with the first inductor, while the second inductor is coupled to ground; and
during a second fraction of the first phase and/or a second fraction of the second phase, the capacitor cell is arranged in series with the second inductor, while the first inductor is coupled to ground.

12. The power converter of claim 1, wherein
the capacitor cell comprises a Dickson voltage divider.

13. The power converter of claim 1, wherein an inductance L of the inductor measured in Henry is smaller than the capacitance C of the capacitor measured in Farad by at least one or two orders of magnitude.

14. A cascaded power converter comprising
a voltage or current regulated power converter for charging a battery, wherein the power converter is configured to derive electrical power at an output voltage $V_{out}$ at an output of the power converter for charging the battery from electrical power at an input voltage $V_{in}$ at an input of the power converter, wherein the power converter comprises an inductor (L), a capacitor cell, a plurality of switches (S1, S2, S3, S4, S5, S6, S7, S8) and a controller; wherein the capacitor cell comprises a single capacitor or a capacitive voltage divider; wherein the controller is configured to control the plurality of switches such that a commutation cycle of the power converter comprises
a first phase, during which the capacitor cell and the inductor are arranged in series between the input and the output of the power converter;
a second phase, during which the capacitor cell and the inductor are arranged in series parallel to the output of the power converter; and
a third phase, during which the capacitor cell is decoupled from the output of the power converter; during which a charge of the capacitor cell remains unaffected and during which the inductor is arranged between the input and the output of the power converter or parallel to the output of the power converter;
a capacitive voltage divider stage configured to derive the input voltage for the power converter from a global input voltage;
the global input voltage is greater than the input voltage;
a commutation cycle of the capacitive voltage divider stage is synchronized with a commutation cycle of the power converter; and
a frequency of the commutation cycle of the capacitive voltage divider stage is k times smaller than a frequency of the commutation cycle of the power converter, with k being an integer.

15. A method for controlling a power converter, wherein the power converter is configured to derive electrical power at an output voltage $V_{out}$ for charging a battery from electrical power at an input voltage $V_{in}$, wherein the power converter comprises an inductor (L), a capacitor cell and a plurality of switches (S1, S2, S3, S4, S5, S6, S7, S8), wherein the capacitor cell comprises a single capacitor or a capacitive voltage divider; wherein the method comprises
controlling the plurality of switches such that a commutation cycle of the power converter comprises a first phase, during which the capacitor cell and the inductor are arranged in series and during which a voltage across the serial arrangement of the capacitor cell and the inductor corresponds to $V_{in}-V_{out}$;
controlling the plurality of switches such that the commutation cycle of the power converter comprises a second phase, during which the capacitor cell and the inductor are arranged in series and during which the voltage across the serial arrangement of the capacitor cell and the inductor corresponds to $-V_{out}$; and controlling the plurality of switches such that the commutation cycle of the power converter comprises a third phase, during which the capacitor cell is decoupled from the output voltage $V_{out}$, during which a charge of the capacitor cell remains unaffected and during which the voltage across the inductor corresponds to $V_{in}-V_{out}$ or to $-V_{out}$.

16. The method of claim 15, wherein the controller is configured to control the plurality of switches such that within a commutation cycle subsequent to the first phase and/or subsequent to the second phase, the power converter is operated in the third phase.

17. The method of claim 16, wherein the controller is configured to
determine an output current $I_{out}$ at the end of the first phase and/or at the end of the second phase;
control the plurality of switches during the third phase such that the inductor is arranged between the input and the output of the power converter, if the output current $I_{out}$ at the end of the first phase and/or at the end of the second phase is smaller than a reference current $I_{ref}$; and
control the plurality of switches during the third phase such that the inductor is arranged parallel to the output of the power converter, if the output current $I_{out}$ at the end of the first phase and/or at the end of the second phase is greater than the reference current $I_{ref}$.

18. The method of claim 17, wherein the controller is configured to set a duration of the third phase such that at the end of the third phase,
the output current $I_{out}$ is equal to or greater than the reference current $I_{ref}$, if the output current $I_{out}$ at the end of the first phase and/or at the end of the second phase is smaller than a reference current $I_{ref}$; and
the output current $I_{out}$ is equal to or smaller than the reference current $I_{ref}$, if the output current $I_{out}$ at the end of the first phase and/or at the end of the second phase is greater than the reference current $I_{ref}$.

19. The method of claim 15, wherein,
during the first phase, the capacitor cell is charged;
during the second phase, the capacitor cell is discharged.

20. The method of claim 15, wherein,
the power converter comprises a first sub-converter comprising a first plurality of switches (S1, S2, S3, S4) and a first capacitor cell;
the power converter comprises a second sub-converter comprising a second plurality of switches (S5, S6, S7, S8) and a second capacitor cell;
the controller is configured to control the first and second pluralities of switches such that the first and second sub-converters are operated in an interleaved manner, such that
during the first phase, the second capacitor cell is discharged;
during the second phase, the first capacitor cell is discharged; and
during the third phase, the first capacitor cell and the second capacitor cell are decoupled from the output voltage.

21. The method of claim 20, wherein the controller is configured to control the first and second pluralities of switches such that during the first phase and during the second phase, the first capacitor cell is arranged in series with the inductor and the second capacitor cell is arranged in series with the inductor.

22. The method of claim 20, wherein the power converter comprises only a single inductor for the first sub-converter and for the second sub-converter.

23. The method of claim 20, wherein
the first plurality of switches comprises a first switch (S1) configured to couple a first side of the first capacitor cell to the input voltage, a second switch (S2) configured to couple the first side of the first capacitor cell to the inductor, a third switch (S3) configured to couple a second side of the first capacitor cell to the inductor, and a fourth switch (S4) configured to couple the second side of the first capacitor cell to ground;
the second plurality of switches comprises an $8^{th}$ switch (S8) configured to couple a first side of the second capacitor cell to the input voltage, a $7^{th}$ switch (S7) configured to couple the first side of the second capacitor cell to the inductor, a $6^{th}$ switch (S6) configured to couple a second side of the second capacitor cell to the inductor, and a $5^{th}$ switch (S5) configured to couple the second side of the second capacitor cell to ground.

24. The method of claim 20, wherein
the first and the second capacitor cells are arranged in series between a positive and negative contact of the input voltage;
a first end of the first capacitor cell is coupled to the positive contact of the input voltage;
a second end of the first capacitor cell is coupled to a first end of the second capacitor cell;
a second end of the second capacitor cell is coupled to the negative contact of the input voltage;
the plurality of switches comprises
a first switch (S1) configured to couple the second end of the first capacitor cell to the inductor,
a second switch (S2) configured to couple the second end of the first capacitor cell to ground,
a third switch (S3) configured to couple the second end of the second capacitor cell to ground, and
a fourth switch (S4) configured to couple the first end of the first capacitor cell to the inductor.

25. The method of claim 15, wherein
the power converter comprises a first inductor and a second inductor;
the controller is configured to control the plurality of switches such that
during a first fraction of the first phase and/or a first fraction of the second phase, the capacitor cell is arranged in series with the first inductor, while the second inductor is coupled to ground; and
during a second fraction of the first phase and/or a second fraction of the second phase, the capacitor cell is arranged in series with the second inductor, while the first inductor is coupled to ground.

26. The method of claim 15, wherein
the capacitor cell comprises a Dickson voltage divider.

27. The method of claim 15, wherein an inductance L of the inductor measured in Henry is smaller than the capacitance C of the capacitor measured in Farad by at least one or two orders of magnitude.

* * * * *